United States Patent
Venugopal

(10) Patent No.: US 9,840,965 B2
(45) Date of Patent: Dec. 12, 2017

(54) SKEWED COMBUSTION CHAMBER FOR OPPOSED-PISTON ENGINES

(71) Applicant: Achates Power, Inc., San Diego, CA (US)

(72) Inventor: Rishikesh Venugopal, San Diego, CA (US)

(73) Assignee: ACHATES POWER, INC., San Diego, CA (US)

(*) Notice: Subject to any disclaimer, the term of this patent is extended or adjusted under 35 U.S.C. 154(b) by 41 days.

(21) Appl. No.: 14/815,747

(22) Filed: Jul. 31, 2015

(65) Prior Publication Data

US 2017/0030262 A1    Feb. 2, 2017

(51) Int. Cl.
| | |
|---|---|
| F02B 31/00 | (2006.01) |
| F02B 75/28 | (2006.01) |
| F02F 3/28 | (2006.01) |
| F02B 23/06 | (2006.01) |
| F02M 61/14 | (2006.01) |
| F01B 7/14 | (2006.01) |

(52) U.S. Cl.
CPC ............. *F02B 75/282* (2013.01); *F01B 7/14* (2013.01); *F02B 23/0621* (2013.01); *F02B 23/0624* (2013.01); *F02B 23/0651* (2013.01); *F02B 23/0678* (2013.01); *F02F 3/28* (2013.01); *F02M 61/14* (2013.01); *Y02T 10/125* (2013.01)

(58) Field of Classification Search
CPC ............. F02B 75/282; F02B 75/12; F02F 3/28
USPC ........................ 123/51 R, 299, 301
See application file for complete search history.

(56) References Cited

U.S. PATENT DOCUMENTS

| | | |
|---|---|---|
| 1,143,408 A | 6/1915 | Kramer |
| 1,464,268 A | 8/1923 | Keller |
| 1,486,583 A | 3/1924 | Huskisson |
| 1,515,391 A | 11/1924 | Keller |
| 1,523,453 A | 1/1925 | Scott |
| 1,582,792 A | 4/1926 | Schultz ................. 123/276 |
| 2,393,085 A | 1/1946 | Wuehr |
| 2,463,418 A | 3/1949 | Pescara |
| 2,682,862 A | 7/1954 | Camnar |
| 2,805,654 A | 9/1957 | Jacklin |
| 2,853,983 A | 9/1958 | Sawle |

(Continued)

FOREIGN PATENT DOCUMENTS

| | | |
|---|---|---|
| BE | 388676 | 5/1932 |
| DE | 102004010361 A1 | 12/2004 |

(Continued)

OTHER PUBLICATIONS

Hofbauer, P., *SAE Publication* 2005-07-1548, "Opposed Piston Opposed Cylinder (opoc) Engine for Military Ground Vehicles," Apr. 2005.

(Continued)

*Primary Examiner* — Marguerite McMahon
(74) *Attorney, Agent, or Firm* — Terrance A. Meador

(57) ABSTRACT

A combustion chamber for an opposed-piston engine has a rotationally skewed shape in a longitudinal section that is orthogonal to a chamber centerline, between diametrically-opposed openings of the combustion chamber through which fuel is injected. The rotationally skewed shape interacts with swirl to generate a tumble bulk charge air motion structure that increases turbulence.

17 Claims, 6 Drawing Sheets

(56) References Cited

U.S. PATENT DOCUMENTS

| | | |
|---|---|---|
| 4,452,221 A | 6/1984 | Keating |
| 4,872,433 A | 10/1989 | Paul |
| 5,042,441 A | 8/1991 | Paul et al. |
| 6,152,101 A | 11/2000 | Parsi |
| 6,170,443 B1 | 1/2001 | Hofbauer |
| 6,182,619 B1 | 2/2001 | Spitzer |
| 6,269,789 B1 | 8/2001 | Abe et al. |
| 7,284,524 B2 | 10/2007 | Matas et al. |
| 7,438,039 B2 | 10/2008 | Poole et al. |
| 7,597,084 B2 | 10/2009 | Vachon et al. |
| 8,677,950 B2 | 3/2014 | Hofbauer |
| 8,770,168 B2 | 7/2014 | Cornwell et al. |
| 8,783,218 B2 | 7/2014 | Shen et al. |
| 8,800,528 B2 * | 8/2014 | Fuqua .................. F01B 7/02 123/299 |
| 8,820,294 B2 | 9/2014 | Fuqua et al. |
| 2006/0124084 A1 | 6/2006 | Hofbauer et al. |
| 2006/0157003 A1 | 7/2006 | Lemke et al. |
| 2008/0006238 A1 | 1/2008 | Hofbauer et al. |
| 2008/0115771 A1 | 5/2008 | Elsbett |
| 2008/0127947 A1 | 6/2008 | Hofbauer et al. |
| 2009/0159022 A1 | 6/2009 | Chu |
| 2010/0107868 A1 | 5/2010 | Scharp et al. |
| 2010/0224162 A1 | 9/2010 | Hofbauer |
| 2010/0282219 A1 | 11/2010 | Alonso |
| 2011/0041684 A1 | 2/2011 | Kortas et al. |
| 2011/0271932 A1 * | 11/2011 | Fuqua .................. F01B 7/02 123/301 |
| 2012/0073526 A1 | 3/2012 | Dion et al. |
| 2012/0073541 A1 * | 3/2012 | Fuqua .................. F01B 7/02 123/301 |
| 2012/0125298 A1 | 5/2012 | Lemke et al. |
| 2012/0234285 A1 | 9/2012 | Venugopal et al. |
| 2012/0285418 A1 | 11/2012 | Elsbett et al. |
| 2013/0014718 A1 | 1/2013 | Shen et al. |
| 2013/0036999 A1 | 2/2013 | Levy et al. .................. 123/299 |
| 2013/0213342 A1 | 8/2013 | Burton et al. |
| 2014/0014063 A1 | 1/2014 | Redon |
| 2015/0122227 A1 | 5/2015 | Abani et al. |

FOREIGN PATENT DOCUMENTS

| | | |
|---|---|---|
| DE | 102006055251 A1 | 5/2008 |
| FR | 50349 | 3/1940 |
| GB | 320439 | 10/1929 |
| GB | 531366 | 1/1941 |
| GB | 562343 | 6/1944 |
| JP | 52004909 A | 1/1977 |
| JP | 2009-138718 | 6/2009 |
| SU | 1216394 A1 | 3/1986 |
| WO | WO-02/48524 A1 | 6/2002 |
| WO | WO-2007/006469 A2 | 1/2007 |
| WO | WO-2009/061873 A1 | 5/2009 |

OTHER PUBLICATIONS

Franke, M., *SAE Publication* 2006-01-0277, "Opposed Piston Opposed Cylinder (opoc) 450 Engine: Performance Development by CAE Simulations and Testing," M. Franke, et al, Apr. 2006.

Hirsch, N.R., et al, *SAE Publication* 2006-01-0926, "Advanced Opposed Piston Two-stroke Diesel Demonstrator," Apr. 2006.

International Search Report/Written Opinion for PCT/US2011/000692, dated Aug. 18, 2011.

International Search Report/Written Opinion for PCT/US2011/001436, dated Nov. 3, 2011.

International Search Report/Written Opinion for PCT/US2012/038061, dated May 16, 2012.

International Search Report and Written Opinion for PCT/US2016/043127, dated Oct. 13, 2016.

* cited by examiner

SKEWED COMBUSTION CHAMBER FOR OPPOSED-PISTON ENGINES

RELATED APPLICATIONS

This application contains subject matter related to the subject matter of the following commonly-owned applications: U.S. Ser. No. 13/066,589, published as US 2011/0271932, now U.S. Pat. No. 8,800,528; U.S. Ser. No. 13/136,954, published as US 2012/0073541, now U.S. Pat. No. 8,820,294; U.S. Ser. No. 14/117,831, published as US 2014/0083396, now U.S. Pat. No. 9,309,807; U.S. Ser. No. 13/843,686, published as US 2013/0213342; U.S. Ser. No. 14/026,931, published as US 2014/0014063; U.S. Ser. No. 14/074,580, published as US 2015/0122227, now U.S. Pat. No. 9,211,797; and, U.S. Ser. No. 14/675,407, published as US 2016/0290224.

FIELD OF THE DISCLOSURE

The field includes opposed-piston engines in which a combustion chamber is defined between end surfaces of pistons disposed in opposition in the bore of a cylinder. More particularly, the field includes opposed-piston engines with combustion chambers having shapes that promote mixing of charge air with injected fuel.

BACKGROUND OF THE DISCLOSURE

The related patent applications describe two-stroke cycle, compression-ignition, opposed-piston engines in which pairs of pistons move in opposition in the bores of ported cylinders. A two-stroke cycle opposed-piston engine completes a cycle of engine operation with two strokes of a pair of opposed pistons. During a compression stroke, as the pistons begin to move toward each other, charge air is admitted into the cylinder, between the end surfaces of the pistons. As the pistons approach respective top center ("TC") locations to form a combustion chamber the charge air is increasingly compressed between the approaching end surfaces. When the end surfaces are closest to each other, near the end of the compression stroke, a minimum combustion chamber volume ("minimum volume") occurs. Fuel injected directly into the cylinder mixes with the compressed charge air. Combustion is initiated when the compressed air reaches temperature and pressure levels that cause the fuel to begin to burn; this is called "compression ignition". Combustion timing is frequently referenced to minimum volume. In some instances, injection occurs at or near minimum volume; in other instances, injection may occur before minimum volume. In any case, in response to combustion the pistons reverse direction and move away from each other in a power stroke. During a power stroke, the pistons move toward bottom center ("BC") locations in the bore. As the pistons reciprocate between top and bottom center locations they open and close ports formed in respective intake and exhaust locations of the cylinder in timed sequences that control the flow of charge air into, and exhaust from, the cylinder.

Combustion is influenced by the degree to which compressed charge air is mixed with injected fuel. Motion and turbulence of charge air in the cylinder are critical factors in facilitating air/fuel mixing and combustion. In an opposed-piston engine, pressurized charge air may enter the cylinder in a tangential direction, which causes the formation of a vortex structure (commonly referred to as "swirl") that spirals longitudinally in the cylinder, across the direction of fuel injection. The bulk swirling motion breaks up the injected fuel streams and entrains fuel droplets into the moving charge air. In the short amount of time preceding ignition it is desirable to intensify the turbulence of charge air motion by generating additional bulk air flow structures. For this purpose, two-stroke, opposed-piston engines are equipped with pistons having crowns with contoured end surfaces that interact with swirling charge air in the cylinder and with squish flow of charge air from the circular peripheries of the piston end surfaces. The interaction produces additional bulk motion structures (commonly referred to as "tumble") in the form of vortexes oriented transversely or tangentially to the swirl vortex. The result is complex, turbulent charge air motion in the combustion chamber that facilitates combustion and that continues to encourage oxidation of unburned fuel and the products of combustion as the power stroke begins.

The related applications are directed to two-stroke cycle, compression-ignition, opposed-piston applications in which the piston end surfaces have shapes that add tumble to the bulk airflow structures. In these applications the combustion chamber is defined by bowls running along end surface ridges that extend on opposite sides of a chamber centerline. Concave inner surfaces of the bowls and ridges guide air flow and fuel plumes in the combustion chamber. Convex outer surfaces of the ridges act like ramps to generate tumble from squish flows. While these ridges do contribute to production of tumble, they also pose significant challenges to engine operation and piston thermal management. The ridges present irregular contours with sharp edges that protrude outwardly from the piston end surfaces and cause hot spots in the piston crowns when combustion occurs. The hot spots impair combustion, which reduces the engine's efficiency. They also produce irregular thermal profiles on crown undersurfaces, which are difficult to manage and which necessitate complex internal piston structures to transport liquid coolant. Finally, the ridged end surfaces and the required cooling structures make the pistons difficult to manufacture and add to the costs of engine production and maintenance.

SUMMARY

These disadvantages are reduced if not eliminated by providing a combustion chamber for an opposed-piston engine having a shape without ridges that interacts with charge air motion to produce tumble. In a plan view of the piston, the combustion chamber has an elongated shape that runs along a chamber centerline, between diametrically-opposed openings of the combustion chamber through which fuel is injected. The combustion chamber structure is defined between the opposing end surfaces of a pair of opposed pistons when the pistons are near top center positions in the bore of a cylinder.

Each piston of the pair of pistons has a longitudinal axis and an end surface that includes no ridges. The end surface meets a sidewall of the piston at a circular, circumferential edge centered on the longitudinal axis. The circumferential edge defines the periphery of the piston end surface. The end surface is flat with respect to a reference plane that is orthogonal to the longitudinal axis and that contains the peripheral edge. Two diametrically-opposed notches formed in the end surface open through the circumferential edge. An elongate, concave bowl is formed in the end surface, and extends between the notches. The bowl and the notches lie beneath the reference plane. The bowl has a skewed shape in which a line following deepest portions of the bowl is offset to one side of a diameter of the piston with which the notches are aligned and which defines a centerline of the combustion chamber.

A combustion chamber is formed between two opposed pistons having flat end surfaces with skewed bowls formed therein. The pistons are aligned with their end surfaces in opposition such that skewed shapes of the bowls are disposed in an opposed facing alignment which forms a combustion chamber having a rotationally skewed shape with respect to a chamber centerline. The rotationally skewed shape interacts with charge air motion to produce one or more tumble motions.

An opposed-piston engine includes at least one cylinder with a bore and longitudinally displaced intake and exhaust ports machined or formed in the cylinder, near respective ends thereof. Two pistons with flat end surfaces are disposed in the bore in opposition to each other. Each flat end surface has a bowl with a skewed shape formed therein. A combustion chamber with diametrically opposed openings for admitting fuel is formed between the bowls when the pistons are near top center locations in the bore. In a vertical sectional view, the combustion chamber has a rotationally skewed shape with respect to a chamber centerline. The rotationally skewed shape interacts with charge air motion to produce one or more tumble motions.

DETAILED DESCRIPTION OF THE PREFERRED EMBODIMENTS

Figure 1:
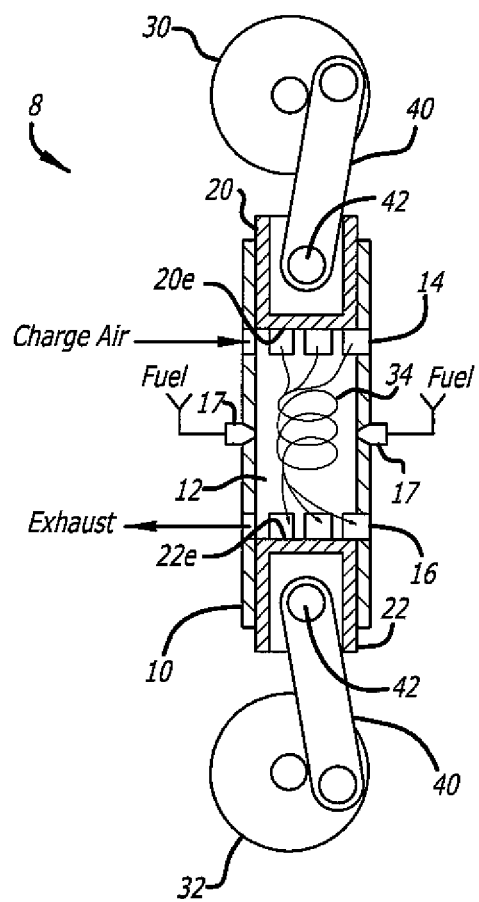
FIG. 1 is a schematic illustration of an opposed-piston engine of the prior art.

FIG. 1 is a schematic representation of a two-stroke cycle internal combustion engine 8 of the opposed-piston type that includes at least one cylinder 10. The cylinder includes a bore 12 and longitudinally displaced intake and exhaust ports 14 and 16 machined or formed in the cylinder, near respective ends thereof. Each of the intake and exhaust ports includes one or more circumferential arrays of openings in which adjacent openings are separated by a solid portion of the cylinder wall (also called a "bridge"). In some descriptions, each opening is referred to as a "port"; however, the construction of a circumferential array of such "ports" is no different than the port constructions in FIG. 1.

Fuel injection nozzles 17 are secured in threaded holes that open through the side surface of the cylinder. Two pistons 20, 22 are disposed in the bore 12 with their end surfaces 20e, 22e in opposition to each other. For convenience, the piston 20 is referred to as the "intake" piston because of its proximity to the intake port 14. Similarly, the piston 22 is referred to as the "exhaust" piston because of its proximity to the exhaust port 16. Preferably, but not necessarily, the intake piston 20 and all other intake pistons are coupled to a crankshaft 30 disposed along one side of the engine 8; and, the exhaust piston 22 and all other exhaust pistons are coupled to a crankshaft 32 disposed along the opposite side of the engine 8.

Operation of an opposed-piston engine such as the engine 8 with one or more ported cylinders (cylinders with intake and exhaust ports formed near ends thereof) such as the cylinder 10 is well understood. In this regard, in response to combustion the opposed pistons move away from respective TC positions where they are at their innermost positions in the cylinder 10. While moving from TC, the pistons keep their associated ports closed until they approach respective BC positions where they are at their outermost positions in the cylinder and the associated ports are open. The pistons may move in phase so that the intake and exhaust ports 14, 16 open and close in unison. Alternatively, one piston may lead the other in phase, in which case the intake and exhaust ports have different opening and closing times.

As charge air enters the cylinder 10 through the intake port 14, the shapes of the intake port openings cause the charge air to rotate in a vortex 34 about the cylinder's longitudinal axis, which spirals in the direction of the exhaust port 16. A swirl vortex 34 promotes air/fuel mixing, combustion, and suppression of pollutants. Swirl velocity increases as the end surfaces 20e and 22e move together.

Figure 2:
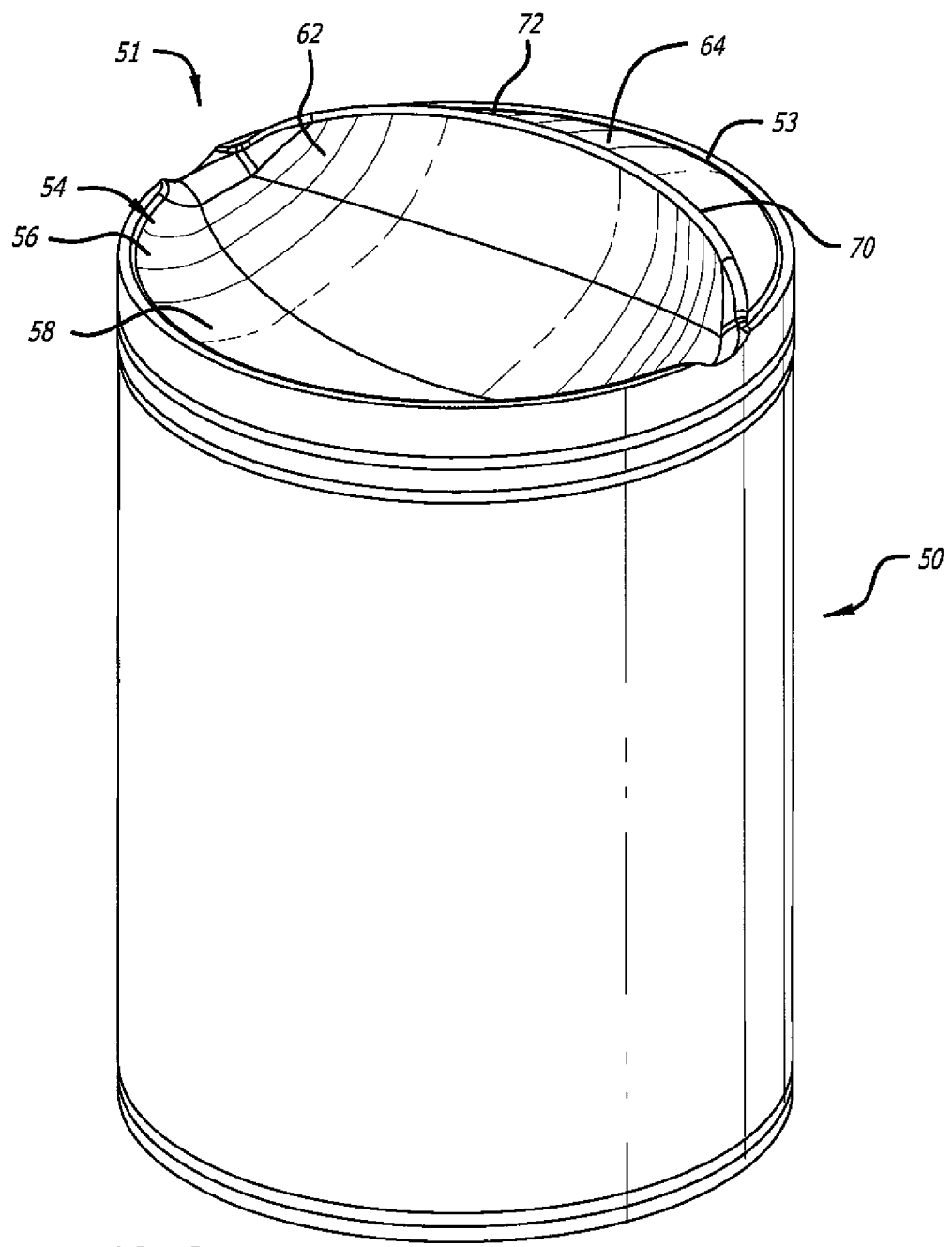
FIG. 2 is an isometric view of a piston of the prior art which has an end surface shaped to form a combustion chamber with the end surface of a counterpart opposed piston

FIG. 2 is an isometric view of a prior art piston for an opposed-piston engine that is taught in related U.S. Pat. No. 8,800,528. The piston 50 has an end surface 51 that is shaped to form a combustion chamber with the end surface of an opposing piston. The end surface 51 of the piston has a periphery 53 surrounding a bowl 54 defining a concave surface 56. The concave surface 56 includes a first portion 58 curving away from the periphery 53 toward the interior of the piston 50. The concave surface 56 further includes a second portion 62 curving away from the first portion 58 and protruding outwardly in part from the end surface 51. A convex surface 64 opposite the bowl 54 curves away from the periphery 53 and protrudes outwardly from the end surface 51. The convex surface 64 meets the second portion 62 of the concave surface 56 to form a ridge 70 therewith. The ridge 70 has an edge 72. The end surface structure is provided on both pistons and the pistons are disposed in the bore of a ported cylinder with their end surfaces oriented to place complementary curved surfaces of the end surface structures in opposition so as to define a combustion chamber. The combustion chamber space defined between these two end surfaces has a geometry that reinforces and sustains a charge air tumble motion which encourages fuel/air mixing. However, when combustion occurs, the edge 72 of the ridge becomes an elongated, curved hot spot.

Skewed Combustion Chamber Construction:

Opposing pistons constructed according to this disclosure have flat end surfaces. An oblong concave bowl (also called a "recess" or a "cavity") with a skewed construction is formed in each end surface. The pistons are rotationally oriented in a cylinder bore so as to align their bowls in opposition. Near the end of a compression stroke when the pistons are nearest together, the opposing bowls define a combustion chamber having a skewed shape that interacts with swirl to generate tumble flow structures in bulk air motion. Opposed pairs of notches in the end surfaces form diametrically-opposed openings through which fuel is injected into the combustion chamber. The flat aspect of the end surface eliminates hot spots caused by outwardly-extending ridges.

Piston Construction:

The flat end surface of each piston meets a piston sidewall at a peripheral edge. The peripheral edge has a circular shape that is centered on a longitudinal axis of the piston and disposed at a single longitudinal level of the piston. A pair of notches is formed in the end surface. The notches are positioned in opposition on the peripheral edge, in alignment with an end surface diameter. The concave bowl formed in the end surface has an oblong shape that is elongated along the end surface diameter, between the notches. The bowl is flanked on either side by flat end surface portions that extend to the peripheral edge. The bowl has opposing sidewalls and a curved bottom portion which connects the sidewalls smoothly in a vertical section, wherein a maximum depth of the bowl is measured from a point of the bottom portion which is offset from, that is to say, positioned to one side of, a plane containing the piston's longitudinal axis and the end surface diameter.

Figure 3:
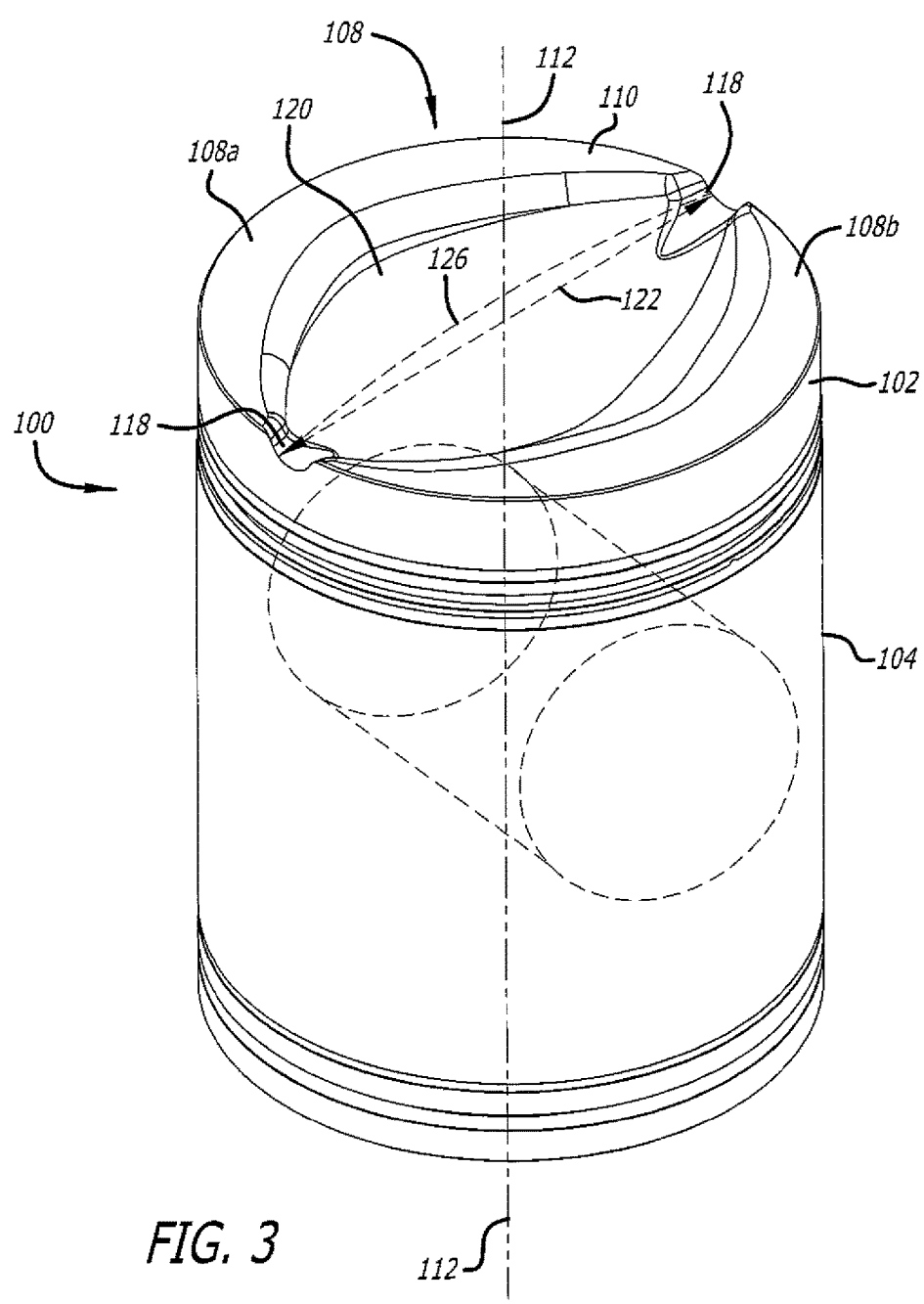
FIG. 3 is an isometric view of a piston according to this disclosure.
Figure 4:
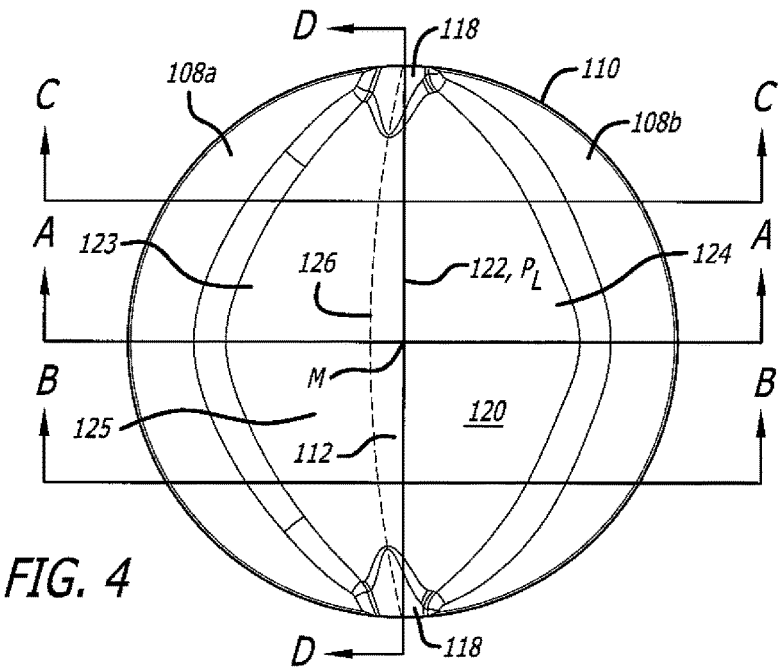
FIG. 4 is a plan view of an end surface of the piston of FIG. 3 showing a bowl formed in the end surface.

FIG. 3 is an isometric view of a piston 100 for an opposed-piston engine; FIG. 4 is a plan view of the end surface of the piston. Referring now to FIGS. 3 and 4, the structural features of piston end surfaces that define the combustion chamber are essentially the same, if not identical, for each piston; accordingly, the piston 100 shown in these figures represents intake and exhaust pistons. The piston 100 comprises a crown 102 attached to, affixed to, or manufactured with a skirt 104 to form a continuous cylindrical sidewall of the piston. The crown 102 comprises a flat end surface 108. The sidewall and end surface 108 meet at a peripheral edge 110. The peripheral edge 110 has a circular shape that is centered on the longitudinal axis 112 of the piston as shown in the plan view of FIG. 4. A pair of notches 118 and a concave bowl 120 are formed in the end surface 108. The notches 118 are positioned in opposition in the peripheral edge 110, in alignment with a diameter 122 of the piston at the end surface.

Figure 4A:
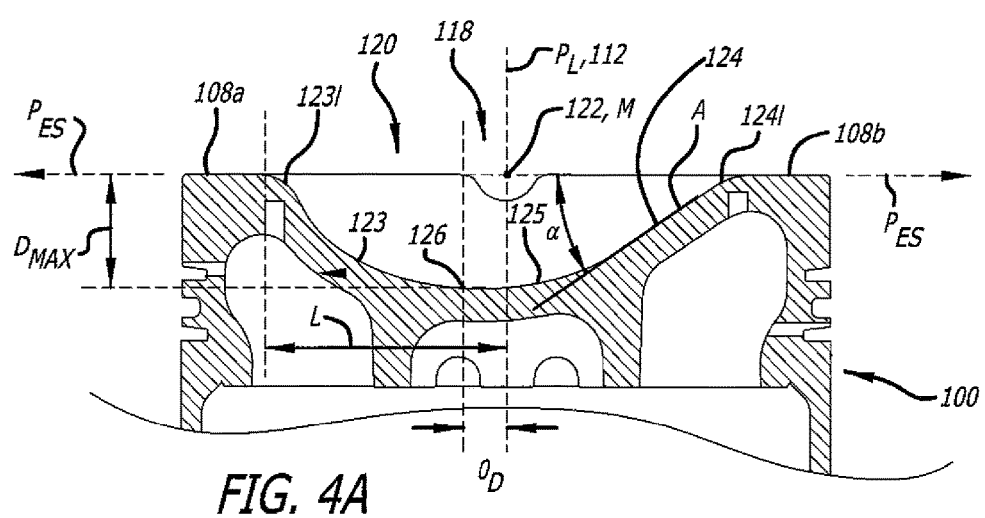
FIG. 4A is a longitudinal diametric sectional view of the facing sidewalls of the bowl, the view being through a longitudinal plane that is orthogonal to a diameter of the end surface.

FIG. 4A is a longitudinal, diametric sectional view of the facing sidewalls of the bowl 120, the view being through a longitudinal plane that is orthogonal to a diameter of the end surface. With reference to FIGS. 4 and 4A, the concave bowl 120 has an oblong shape that is elongated along the diameter 122 and that connects smoothly with each notch 118. The concave bowl 120 is abutted on opposing sides of its opening by flat end surface portions 108a and 108b that extend to the peripheral edge 110. The peripheral edge 110 and the flat end surface portions 108a and 108b are disposed at a single longitudinal level of the piston where an end surface plane $P_{ES}$, orthogonal to the longitudinal axis 112 and intersecting the end surface diameter 122, is defined.

As shown in the sectional view of FIG. 4A, the concave bowl 120 has opposing sidewalls 123 and 124 and a curved bottom portion 125 which connects the sidewalls smoothly in the illustrated vertical section. With reference to FIGS. 4 and 4A, the sidewall 123 includes a rounded lip 123l where the sidewall 123 is connected smoothly to the end surface portion 108a, and the sidewall 124 includes a rounded lip 124l where the sidewall 124 is connected smoothly to the end surface portion 108b.

As shown in the sectional view of FIG. 4A, a bowl depth D is the maximum distance between the curved bottom portion 125 and the end surface plane $P_{ES}$ that is measured in each of a succession of vertical sections taken along the diameter 122. There is a maximum depth $D_{max}$ of the concave bowl 120 in a vertical section. According to this disclosure, the bowl 120 is constructed such that each bowl depth D is measured from a point of the bottom portion 125 that is offset in an orthogonal direction from (positioned to one side of) a longitudinal cut plane $P_L$. The plane $P_L$ contains the piston's longitudinal axis and the diameter 122; and, the planes $P_L$ and $P_{ES}$ are mutually orthogonal. In some instances, the bowl depth D may diminish smoothly from a $D_{max}$ position aligned with the midpoint M of the diameter 122, toward each of the notches 118. As seen in the plan view of FIG. 4, the depth D positions are traced along the bottom portion 125 by a curved arc shape 126 having a concave side that faces the plane $P_L$. In some cases where the $D_{max}$ position is aligned with the midpoint M, the maximum depth D may diminish at the same rate in each direction from the midpoint so that the curved arc shape is symmetrical with respect to the plane $P_L$. Although one such instance is shown in FIGS. 4 and 4A, it is not intended to be limiting. For example, the bowl depth D may diminishes smoothly from a maximum bowl depth $D_{max}$ that is located between the midpoint M of the end surface diameter in plan and a respective one of the notches 118.

As shown in the sectional view of FIG. 4A, the offset of the bowl depth locations along the curved arc 126 causes the sidewall 123 to slope more steeply toward the bottom portion 125 than the sidewall 124. The sidewall 124 has a deflection portion A which is approximately linear. The deflection portion A is inclined on the inside of the bowl 120 at a chute angle α with respect to the end surface plane $P_{ES}$. In some instances, the chute angle α diminishes smoothly from a maximum value ($α_{max}$) position relative to the midpoint M of the diameter 122 toward each of the notches 118. In such instances, the chute angle α may diminish at the same rate in each direction from the midpoint M, toward a respective notch 118. Although one such instance is shown in FIGS. 4 and 4A, it is not intended to be limiting.

As shown in the sectional view of FIG. 4A, the steepness of the slope of the sidewall 123 is dependent on a depth D and an offset $O_D$. The steepness is further dependent on a distance along a line L that is orthogonal to the plane $P_L$, and that extends between the plane $P_L$ and a point where the curvature of the lip 123l transitions to the flat end surface portion 108a.

The intended effect of locating the maximum depths D to one side of the longitudinal cut plane is to give the bowl 120 a skewed shape in a longitudinal diametric sectional view. The shape and degree of the bowl's skew can be altered by variation of one or more of the bowl parameters D, α, L, and $O_D$, and possibly others. Further, although the bowl's skew seen in FIG. 4A is leftward, it should be evident that the skew may be rightward.

Figure 5A:
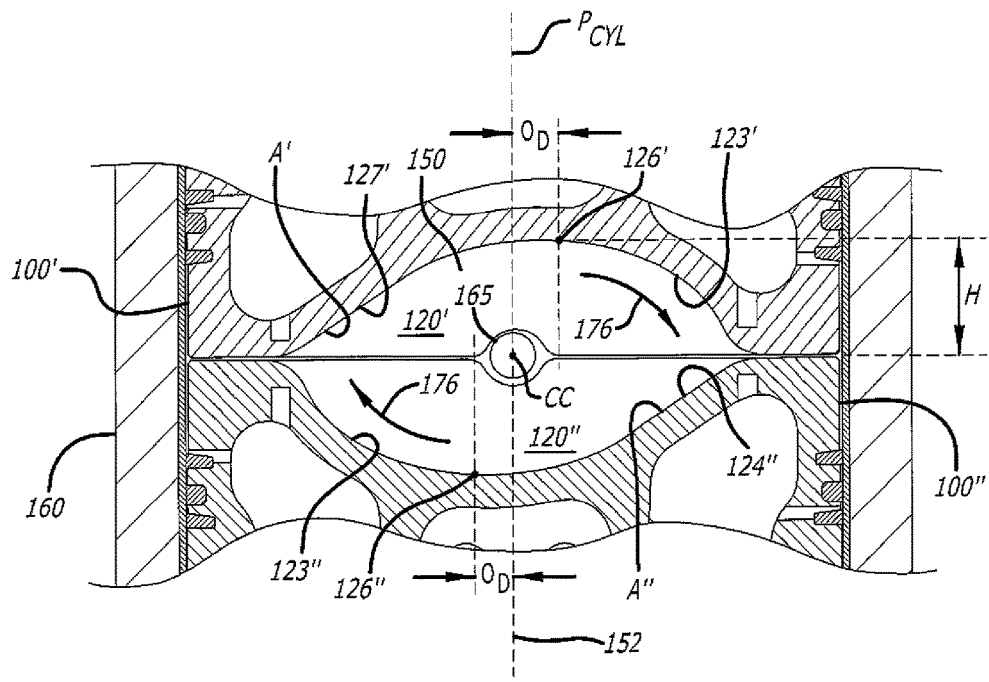
FIGS. 5A, 5B, and 5C are longitudinal diametric sectional views of a combustion chamber formed between the opposing end surfaces of a pair of pistons having end surfaces shaped as per FIG. 4, in which the views correspond to parallel planes indicated by lines A-A, B-B, and C-C of FIG. 4.
Figure 5B:
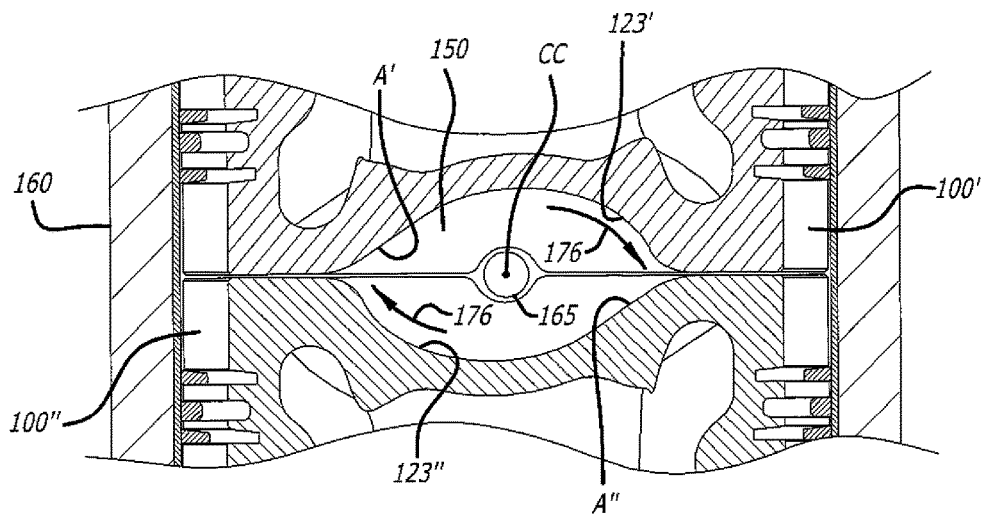
Figure 5C:
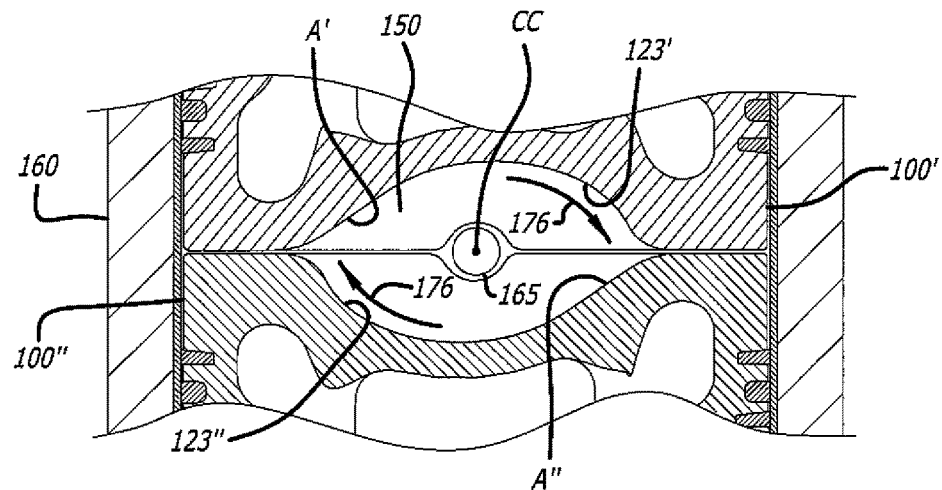
Figure 5D:
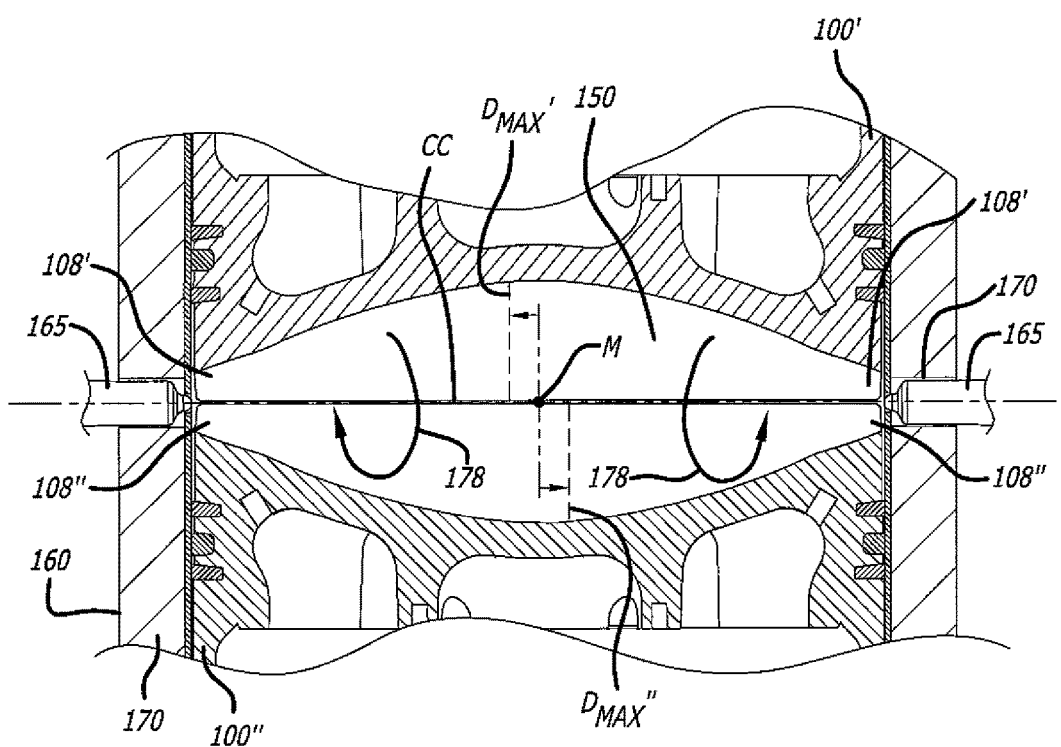
FIG. 5D is a longitudinal diametric sectional view of the combustion chamber of FIGS. 5A, 5B, and 5C, in which the view corresponds to the line D-D of FIG. 4, which is orthogonal to the lines A-A, B-B, and C-C of FIG. 4.
Figure 4:
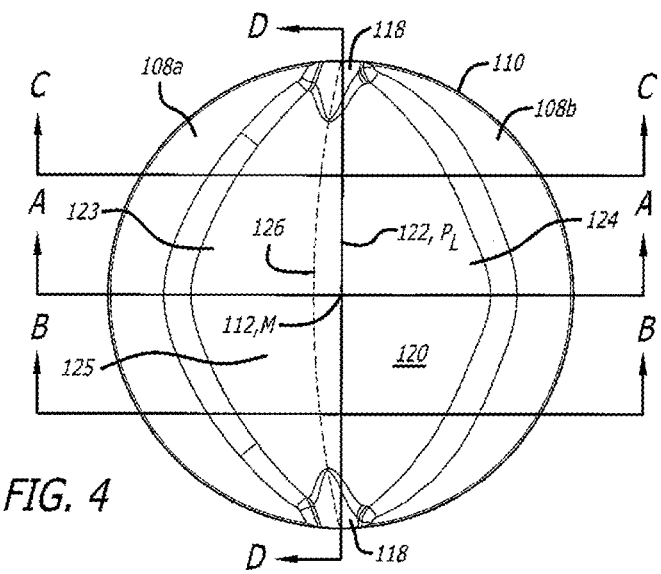
Figure 4A:
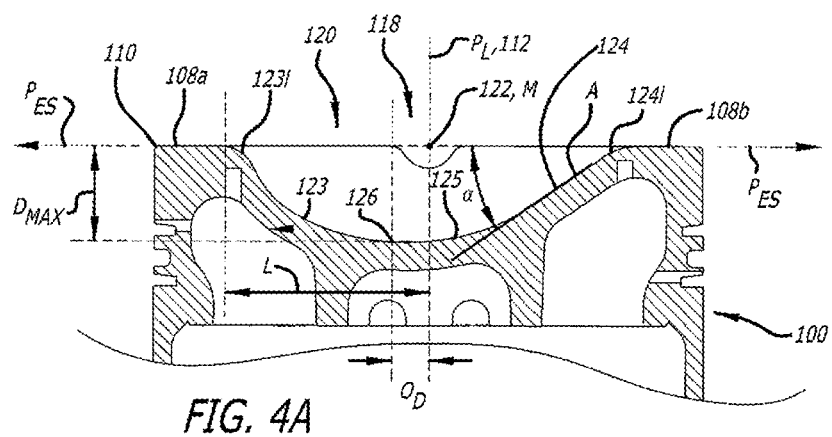

The longitudinal diametric sectional views of a combustion chamber seen in FIGS. 5A, 5B, and 5C show a combustion chamber 150 formed between end surfaces of two pistons 100' and 100" disposed in opposition in the bore of a cylinder 160. These sectional views are transverse to a combustion chamber centerline CC, which is best seen in FIG. 5D. For example, these sectional views are orthogonal to the chamber centerline CC. The end surfaces 108' and 108" are constructed according to FIGS. 3, 4, and 4A. The pistons 100' and 100" are rotated on their longitudinal axes to positions in which the notches 118 of the end surfaces are aligned in longitudinal opposition, and the bowls 120 are mutually oriented so that deflection portions A' and A" are in opposition respectively with steeply curved sidewalls 123" and 123'. This disposes the skewed shapes of the bowls in an opposed facing alignment that defines a combustion chamber 150 having a shape that is rotationally skewed in the longitudinal sectional views of FIGS. 5A, 5B, and 5C. Although the figures illustrate a rotational skew in a clockwise direction, it should be evident that the pistons may be rotated to orient the skew in a counterclockwise direction. The combustion chamber's shape is rotationally skewed because the deepest portions of the bowls 120' and 120" are disposed on opposite sides of a longitudinal plane $P_{CYL}$ that contains a longitudinal axis 152 of the cylinder and that coincides with the longitudinal planes of the pistons 100' and 100". Further, the skew is centered on the combustion chamber centerline CC, which is aligned with the piston diameters 122. In a longitudinal sectional view of the combustion chamber shown in FIG. 5D, which is orthogonal to the views of FIGS. 5A, 5B, and 5C, the combustion chamber has an elongated shape with opposite end portions that taper along the combustion chamber centerline CC toward fuel injectors 165 that are mounted in a cylinder sidewall 170. The fuel injectors 165 are aligned with the combustion chamber centerline CC and positioned to inject opposing fuel sprays into the combustion chamber 150 through injection ports that are defined between opposing notches 108' and 108". For example, the fuel injectors 165 may be constructed to emit fuel sprays that comprise a plurality of plumes having injection axes that are either collinear with the chamber centerline CC, in the manner illustrated in FIGS. 10A-10C of related U.S. Pat. No. 8,820,294, or that are tangential the chamber centerline CC. For example, the fuel sprays may comprise three plumes or four plumes.

In the sectional views of FIGS. 5A-5D, the pistons 100' and 100" are near TC locations in the bore and the combustion chamber 150 is near minimum volume. With reference to FIGS. 5A-5C, as the pistons approach each other at minimum volume, squish motion from between the peripheries of the piston end into the combustion chamber becomes stronger. This squish flow preferentially separates more where the bowl profiles are deeper (123' and 123") as compared to the shallower regions of the bowls (A' and A"). This preferential flow separation sets up a rotational structure 176 circulating around the combustion chamber centerline CC. As can be seen, the rotational structure circulates transversely to the swirl axis, which is generally collinear with the cylinder axis 152: the structure 176 is therefore tumble. The strength of this tumble motion increases as the disposition of the deepest portions of the opposed bowls increases. The generation of this tumble motion is useful to ensure the diffusion plumes resulting from ignition of the fuel sprays emanating from the opposing injectors are centered in the combustion chamber, thus minimizing heat rejection to the combustion chamber walls.

Tumble motions 178 are also set up in the orthogonal cut plane shown in FIG. 5D. These tumble motions may result from a number of sources, such as interaction of swirl and squish motions, residual tumble in the cylinder from the scavenging process, and the interactions of the charge motion with fuel sprays. They have less of an effect on the performance and emissions characteristics of the engine, as the dominant factor in this longitudinal section is the momentum arising from fuel injection.

It is noted that the deepest parts of the bowls could be offset from the centerline midpoint M. With reference to FIG. 5D, for instance, for each bowl 108' and 108", the deepest part of the bowl may be closer to a respective one of the injectors 165. For example the maximum depth of the bowl 108' may be located between the midpoint M and the left hand injector 165, while the maximum depth of the bowl 108" may be located between the midpoint M and the right hand injector 165. This proximity of the deepest part of the bowl to an injector has the potential for benefits with respect to reducing plume impingement on the bowls early in the combustion process and minimizing heat rejection to the bowl trench regions later in the combustion process. Reducing heat rejection to the bowl trench regions may further reduce coolant flow rates, thereby improving engine brake specific fuel consumption.

Although principles of piston and combustion chamber constructions have been described with reference to presently preferred embodiments, it should be understood that various modifications can be made without departing from the spirit of the described principles. Accordingly, the scope of patent protection accorded to these principles is limited only by the following claims.

The invention claimed is:

1. A piston for an opposed-piston engine, comprising a flat end surface without a ridge, the flat end surface having an elongated, concave bowl formed therein to define a combustion chamber with an elongated bowl formed in a flat end surface of an opposing piston; the flat end surface meeting a piston sidewall at a peripheral edge having a circular shape that is centered on a longitudinal axis of the piston and that is disposed at a single longitudinal level of the piston; a pair of notches formed in the end surface and positioned in opposition on the peripheral edge, in alignment with an end surface diameter; the concave bowl having an oblong shape that is elongated along the end surface diameter, between the notches; the concave bowl being flanked on either side by flat end surface portions that extend to the peripheral edge; the concave bowl having opposing sidewalls and a curved bottom portion which connects the sidewalls smoothly in a vertical section; and, the concave bowl having a maximum depth $D_{max}$ between the curved bottom portion and a plane $P_{ES}$ which intersects the longitudinal axis and is positioned at the longitudinal level, the maximum depth $D_{max}$ being measured at a point on the curved bottom portion which is offset in an orthogonal direction from a longitudinal plane $P_L$ which contains the longitudinal axis of the piston and the end surface diameter.

2. The piston of claim 1, wherein a bowl depth D is a maximum distance between the curved bottom portion of the bowl and the plane $P_{ES}$ in a longitudinal sectional view of the piston taken along the end surface diameter; the bowl depth D is measured from a point of the curved bottom portion that is offset in an orthogonal direction from the longitudinal plane $P_L$; and, the planes $P_L$ and $P_{ES}$ are mutually orthogonal.

3. The piston of claim 2, wherein the bowl depth D diminishes smoothly from the maximum bowl depth $D_{max}$ when the maximum bowl depth $D_{max}$ is at a position aligned with a midpoint M of the end surface diameter in plan, toward each of the notches, such that the depths D are traced along the bottom portion by a curved arc shape having a concave side that faces the longitudinal plane $P_L$.

4. The piston of claim 3, wherein the depth D diminishes at the same rate in each direction from the midpoint M such that the curved arc shape is symmetrical with respect to the longitudinal plane $P_L$.

5. The piston of claim 2, in which the bowl depth diminishes smoothly from the maximum bowl depth $D_{max}$ when the maximum bowl depth $D_{max}$ is located between a midpoint M of the end surface diameter in plan and a respective one of the notches.

6. A two-stroke cycle, compression ignition, opposed-piston engine including at least one cylinder with a bore, piston-controlled exhaust and intake ports near respective ends of the cylinder, and a pair of pistons disposed in opposition in the bore, in which:
   each piston has a flat end surface without a ridge, and each flat surface has a concave bowl formed therein that defines a combustion chamber with the concave bowl formed in the flat end surface of the other piston when the pistons are near top center locations in the bore;
   two fuel injectors are disposed in diametrical opposition and in alignment with a centerline of the combustion chamber;
   in a first longitudinal section of the combustion chamber, the combustion chamber has a rotationally skewed shape that is symmetrical with respect to the centerline of the combustion chamber; and,
   in a second longitudinal section of the combustion chamber that is orthogonal to the first longitudinal section, the combustion chamber has an elongated shape with opposite end portions that taper along the centerline of the combustion chamber toward the fuel injectors.

7. The opposed-piston engine of claim 6, in which each flat end surface meets a piston sidewall at a peripheral edge having a circular shape that is centered on a longitudinal axis of the piston and that is disposed at a single longitudinal level of the piston, a pair of notches is formed in the end surface, and the notches are positioned in opposition on the peripheral edge, in alignment with an end surface diameter, wherein:
   each concave bowl has an oblong shape that is elongated along an end surface diameter, between the notches;
   the bowl is flanked on either side by flat end surface portions that extend to the peripheral edge;
   the bowl has opposing sidewalls and a curved bottom portion which connects the sidewalls smoothly in a vertical section; and,
   a maximum depth of the bowl is measured from a point of the curved bottom portion, the point being offset in an orthogonal direction from a plane $P_{ES}$ which intersects the piston longitudinal axis and is positioned at the longitudinal level.

8. The opposed-piston engine of claim 7, in which:
   a bowl depth D is the maximum distance between the curved bottom portion and the plane $P_{ES}$ that is measured in a longitudinal section taken along the end surface diameter;
   the bowl depth D is measured from a point of the bottom portion that is offset in an orthogonal direction from a longitudinal plane $P_L$;
   the plane $P_L$ intersects the longitudinal axis and the end surface diameter; and,
   the planes $P_L$ and $P_{ES}$ are mutually orthogonal.

9. The opposed-piston engine of claim 8, in which the bowl depth D diminishes smoothly from a maximum bowl depth $D_{max}$ that is located between a midpoint M of the end surface diameter in plan and a respective one of the notches.

10. A two-stroke cycle, compression ignition, opposed-piston engine including at least one cylinder with a bore, piston-controlled exhaust and intake ports near respective ends of the cylinder, and a pair of pistons disposed in opposition in the bore, comprising:
    each piston having a flat end surface without a ridge, each end surface having an elongated bowl formed therein;
    a combustion chamber formed between the elongated bowls;
    two fuel injectors disposed in diametrical opposition and in alignment with a centerline of the combustion chamber;
    in a first longitudinal section of the combustion chamber, the combustion chamber having a rotationally skewed shape that is symmetrical with respect to the centerline of the combustion chamber; and,
    in a second longitudinal section of the combustion chamber that is orthogonal to the first longitudinal section, the combustion chamber having an elongated shape with opposite end portions that taper along the centerline of the combustion chamber toward the fuel injectors.

11. The opposed-piston engine of claim 10, in which each flat end surface meets a piston sidewall at a peripheral edge having a circular shape that is centered on a longitudinal axis of the piston and that is disposed at a single longitudinal level of the piston, a pair of notches is formed in the end surface, and the notches are positioned in opposition on the peripheral edge, in alignment with an end surface diameter, wherein: each concave bowl has an oblong shape that is elongated along an end surface diameter, between the notches;
    the bowl is flanked on either side by flat end surface portions that extend to the peripheral edge;
    the bowl has opposing sidewalls and a curved bottom portion which connects the sidewalls smoothly in a vertical section; and,
    a maximum depth of the bowl is measured from a point of the bottom portion which is offset in an orthogonal direction from a plane $P_{ES}$ which intersects the piston longitudinal axis and is positioned at the longitudinal Level.

12. The opposed-piston engine of claim 11, in which:
    a bowl depth D is the maximum distance between the curved bottom portion and the plane $P_{ES}$ that is measured in a longitudinal section taken along the end surface diameter;
    the bowl depth D is measured from a point of the bottom portion that is offset in an orthogonal direction from a longitudinal plane $P_L$;
    the plane $P_L$ intersects the longitudinal axis and the end surface diameter; and,
    the planes $P_L$ and $P_{ES}$ are mutually orthogonal.

13. The opposed-piston engine of claim 12, in which the bowl depth D diminishes smoothly from a maximum bowl depth $D_{max}$ aligned with a midpoint M of the end surface diameter in plan of the notches, such that the depths D are traced along the bottom portion by a curved arc shape having a concave side that faces the longitudinal plane $P_L$.

14. The opposed-piston engine of claim 13, in which, the $D_{max}$ position is aligned with the midpoint M, and the depth D diminishes at the same rate in each direction from the midpoint M such that the curved arc shape is symmetrical with respect to the longitudinal plane $P_L$.

15. The opposed-piston engine of claim 14, in which each fuel injector is constructed to emit a fuel spray with three or four plumes.

16. The opposed-piston engine of claim 12, in which the bowl depth D diminishes smoothly from a maximum bowl depth $D_{max}$ that is located between a midpoint M of the end surface diameter in plan and a respective one of the notches.

17. The opposed-piston engine of claim 16, in which each fuel injector is constructed to emit a fuel spray with three or four plumes.

\* \* \* \* \*

UNITED STATES PATENT AND TRADEMARK OFFICE
CERTIFICATE OF CORRECTION

PATENT NO. : 9,840,965 B2
APPLICATION NO. : 14/815747
DATED : December 12, 2017
INVENTOR(S) : Rishikesh Venugopal It is certified that error appears in the above-identified patent and that said Letters Patent is hereby corrected as shown below:

In the Drawings

Delete Drawing Sheet 4 of 6 and replace with the attached Drawing Sheet 4 of 6

In the Specification

Column 1, Line 14, delete "published as US 2014/0014063;" and replace with "published as US 2014/0014063 now U.S. Patent No. 9,512,779;"

Signed and Sealed this
Thirtieth Day of January, 2018

Joseph Matal
*Performing the Functions and Duties of the*
*Under Secretary of Commerce for Intellectual Property and*
*Director of the United States Patent and Trademark Office*